(12) United States Patent
Li et al.

(10) Patent No.: US 12,128,859 B2
(45) Date of Patent: Oct. 29, 2024

(54) BATTERY SWAPPING METHOD, MODULE, DEVICE AND MEDIUM

(71) Applicant: Contemporary Amperex Technology Co., Limited, Ningde (CN)

(72) Inventors: Zhanliang Li, Ningde (CN); Zhimin Dan, Ningde (CN); Miaomiao Zhang, Ningde (CN); Yu Yan, Ningde (CN); Zhenhui Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 312 days.

(21) Appl. No.: 17/706,648

(22) Filed: Mar. 29, 2022

(65) Prior Publication Data
US 2023/0064434 A1 Mar. 2, 2023

Related U.S. Application Data

(63) Continuation of application No. PCT/CN2021/115793, filed on Aug. 31, 2021.

(51) Int. Cl.
*B60S 5/06* (2019.01)
*G05B 15/02* (2006.01)
*G06T 7/70* (2017.01)

(52) U.S. Cl.
CPC ............. *B60S 5/06* (2013.01); *G05B 15/02* (2013.01); *G06T 7/70* (2017.01)

(58) Field of Classification Search
CPC ... B60S 5/06; G05B 15/02; G06T 7/70; B60L 53/37; B60L 53/80; Y02T 10/70; Y02T 10/7072
See application file for complete search history.

(56) References Cited

U.S. PATENT DOCUMENTS 10,726,642 B1 * 7/2020 Goluguri ............. G06Q 20/308
2016/0368464 A1   12/2016 Hassounah
(Continued)

FOREIGN PATENT DOCUMENTS

CN    202541497 U    11/2012
CN    103065519 A    4/2013
(Continued)

OTHER PUBLICATIONS

The Decision to grant for KR Application No. 10-2021-7034727, dated Feb. 15, 2024, 4 pages.
(Continued)

*Primary Examiner* — Chad G Erdman
(74) *Attorney, Agent, or Firm* — East IP P.C.

(57) ABSTRACT

Embodiments of the present application provide a battery swapping method, module, device and medium. The method includes: acquiring a first image captured for a vehicle within a battery swapping area, and acquiring a first location of a battery on the vehicle; determining a second location of the vehicle in the battery swapping area according to the first image; determining, according to the first location and the second location, a target location of the battery in the battery swapping area to control a battery swapping device to move to the target location for battery swapping. According to the embodiments of the present application, battery swapping can be completed in a case where a user parks the vehicle randomly in the battery swapping area. Thus, convenience of the battery swapping process is improved.

18 Claims, 4 Drawing Sheets

(56) References Cited

U.S. PATENT DOCUMENTS

| | | | | |
|---|---|---|---|---|
| 2022/0203860 | A1* | 6/2022 | Zhang | ................... B60L 53/80 |
| 2023/0080952 | A1* | 3/2023 | Okawa | ................... B60L 53/80 320/107 |

FOREIGN PATENT DOCUMENTS

| | | | | |
|---|---|---|---|---|
| CN | 103072558 | A | * | 5/2013 |
| CN | 109177709 | A | | 1/2019 |
| CN | 110843597 | A | | 2/2020 |
| CN | 111923777 | A | | 11/2020 |
| CN | 113147495 | A | | 7/2021 |
| CN | 113306445 | A | | 8/2021 |
| DE | 202018003439 | U1 | | 9/2018 |
| JP | 2008299415 | A | | 12/2008 |
| JP | 2012199796 | A | | 10/2012 |
| JP | 2020027445 | A | | 2/2020 |
| KR | 100603597 | B1 | | 7/2006 |
| KR | 20160092733 | A | * | 8/2016 |

OTHER PUBLICATIONS

The First Office Action for KR Application No. 10-2021-7034727, dated Aug. 24, 2023, 8 pages.
The First Office Action for JP Application No. 2021-560118, dated Oct. 16, 2023, 10 pages.
Anonymous: "Maintaining Accuracy with the RSSI Location Principle", dated Jun. 10, 2020, 8 pages.
The Communication pursuant to Article 94(3) EPC for European Application No. 21865334.3, dated Jul. 17, 2023, 12 pages.
The International search report for PCT Application No. PCT/CN2021/115793, dated May 26, 2022, 8 pages.
The extended European search report for European Application No. 21865334.3, dated Dec. 2, 2022, 8 pages.

* cited by examiner

BATTERY SWAPPING METHOD, MODULE, DEVICE AND MEDIUM

CROSS REFERENCE TO RELATED APPLICATION

This application is a continuation of International Application No. PCT/CN2021/115793 filed on Aug. 31, 2021, the entire contents of which are incorporated herein by reference.

TECHNICAL FIELD

The present disclosure relates to the field of battery swapping, and in particular, to a battery swapping method, module, device and medium.

BACKGROUND

With the development of electric vehicles, battery swapping technology for vehicles has become one of development modes of battery technology. In the battery swapping technology, how to determine the location of the battery is an urgent problem to be solved.

In the prior art, the vehicle is often stopped at a fixed location through a vehicle limit slot at a certain fixed location in a battery swapping station. Then a battery swapping device is controlled to drive to a certain fixed point within the fixed location to perform related operations of battery swapping.

Then, in this technology, a user is required to stop the vehicle at an accurate location for battery swapping, and the entire battery swapping process is complicated.

SUMMARY

Embodiments of the present application provide a battery swapping method, module, device and medium. Battery swapping can be completed in a case where a user parks the vehicle randomly in the battery swapping area.

In a first aspect, embodiments of the present application provide a battery swapping method applied to a control module, the method comprising: acquiring a first image captured for a vehicle within a battery swapping area, and acquiring a first location of a battery on the vehicle; determining a second location of the vehicle in the battery swapping area according to the first image; determining, according to the first location and the second location, a target location of the battery in the battery swapping area to control a battery swapping device to move to the target location for battery swapping.

According to the battery swapping method of the embodiments of the present application, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved.

In an optional implementation, a signal transmitting module is provided on the vehicle at a location corresponding to the battery, and a signal receiving module is provided on the battery swapping device; the method further comprises: during movement of the battery swapping device in a target area, acquiring, by the signal receiving module, strength values of signals at a plurality of third locations within the target area; the signals being transmitted by the signal transmitting module, and the target area including the target location; updating a third location corresponding to a maximum value among the strength values of the signals at the plurality of third locations as a new target location.

With this embodiment, location error of the battery can be reduced, and thus locating accuracy is improved.

In an optional implementation, the first location is determined by a processing module from a pre-stored correspondence relationship based on model information of the vehicle and transmitted to the control module, and the correspondence relationship is one between the model information of the vehicle and a relative location of the battery on the vehicle.

With this embodiment, the relative location of the battery on the vehicle can be acquired accurately through the stored correspondence relationship. Thus, computing accuracy is improved.

In an optional implementation, after the acquiring a first image captured for a vehicle within a battery swapping area and before the acquiring a first location, the method further comprises: determining the model information of the vehicle based on the first image; transmitting the model information to the processing module, for determining, by the processing module, the first location based on the correspondence relationship.

With this embodiment, the model information of the vehicle can be determined based on the first image, and in turn the first location is determined, so that the first location and below the second location can be computed accurately by providing only an acquiring apparatus of the firs image. In this way, device cost is saved.

In an optional implementation, the number of the first image is plural; the determining a second location of the vehicle in the battery swapping area according to the first image comprises: determining a plurality of second locations in one-to-one correspondence with the plurality of first images; after the determining a second location of the vehicle in the battery swapping area according to the first image, the method further comprises: determining that the vehicle slips, when a distance between at least two second locations of the plurality of second locations is greater than a preset threshold.

With this embodiment, it can be monitored whether the vehicle slips during the battery swapping process, and an alert can be issued timely when the vehicle slips. Thus, safety of battery swapping is improved.

In an optional implementation, after the acquiring a first image captured for a vehicle within a battery swapping area, the method further comprises: determining that a battery swapping process for the vehicle is abnormal, in a case where the first image includes a target biological object.

With this embodiment, in order to ensure the safety of the battery swapping, it is necessary to prohibit the user and biological object from getting off the vehicle. Therefore, when the target biological object is recognized in the first image, it means that a living body such as a user or an animal interferes with the battery swapping process, and thus it is determined that the battery swapping process is abnormal. In this way, the safety of the battery swapping process can be ensured.

In a second aspect, embodiments of the present application provide a battery swapping module, comprising: an image acquiring unit, configured to acquire a first image captured for a vehicle within a battery swapping area, and acquire a first location of a battery on the vehicle; a first location determining unit, configured to determine a second location of the vehicle in the battery swapping area according to the first image; a second location determining unit, configured to determine, according to the first location and the second location, a target location of the battery in the battery swapping area; a battery swapping control unit, configured to control a battery swapping device to move to the target location for battery swapping.

According to the battery swapping module of the embodiments of the present application, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved.

In an optional implementation, a signal transmitting module is provided on the vehicle at a location corresponding to the battery, and a signal receiving module is provided on the battery swapping device; the control module further comprises: a signal acquiring unit, configured to, acquire by the signal receiving module during movement of the battery swapping device in a target area, strength values of signals at a plurality of third locations within the target area; the signals being transmitted by the signal transmitting module, and the target area including the target location; a location updating unit, configured to update a third location corresponding to a maximum value among the strength values of the signals at the plurality of third locations as a new target location.

In an optional implementation, the first location is determined by a processing module from a pre-stored correspondence relationship based on model information of the vehicle and transmitted to the control module, and the correspondence relationship is one between the model information of the vehicle and a relative location of the battery on the vehicle.

In an optional implementation, the module further comprises: an information determining unit, configured to determine the model information of the vehicle based on the first image; an information transmitting unit, configured to transmit the model information to the processing module, for determining, by the processing module, the first location based on the correspondence relationship.

In an optional implementation, the number of the first image is plural; the first location determining unit is configured to: determine a plurality of second locations in one-to-one correspondence with the plurality of first images; the module further comprises: a slip detecting unit, configured to determine that the vehicle slips, when a distance between at least two second locations of the plurality of second locations is greater than a preset threshold.

In an optional implementation, the module further comprises: a fault determining unit, configured to determine that a battery swapping process for the vehicle is abnormal, in a case where the first image includes a target biological object.

In a third aspect, there is provided a battery swapping device, comprising: a processor, and a memory storing computer program instructions, wherein the processor reads and executes the computer program instructions to implement the battery swapping method provided by the first aspect or any optional implementation of the first aspect.

According to the battery swapping device of the embodiments of the present application, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved.

In a fourth aspect, there is provided with a computer storage medium storing computer program instructions thereon, which when executed by a processor, perform the battery swapping method provided by the first aspect or any optional implementation of the first aspect.

According to the computer storage medium of the embodiments of the present application, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved.

BRIEF DESCRIPTION OF THE DRAWINGS

In order to more clearly illustrate technical solutions of the embodiments of the present disclosure, drawings used in the embodiments of the present disclosure will be briefly described below. Obviously, the attached drawings described below are only some embodiments of this application. For those skilled in the art, other drawings may be obtained from these figures without any creative work.

DETAILED DESCRIPTION

Figure 1:
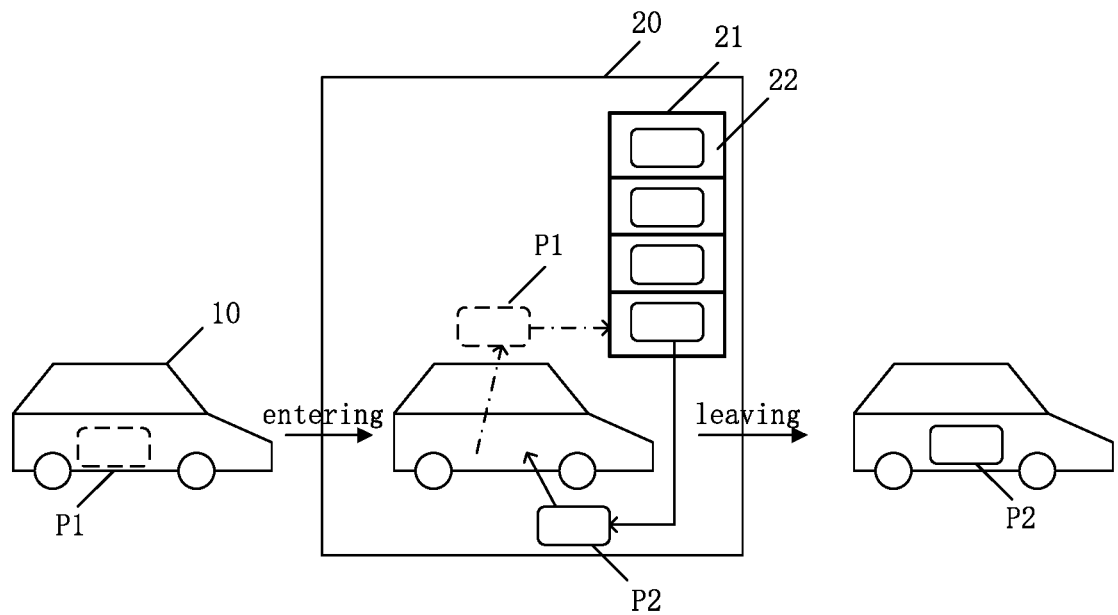
FIG. 1 is a schematic scenario diagram of an exemplary battery swapping scenario provided by an embodiment of the present application.

Features and exemplary embodiments in various aspects of the present disclosure will be described in detail. The present disclosure will be further described in detail below with reference to the accompanying drawings and specific embodiments, to make the purposes, the technical solutions, and the advantages of the present application clearer. It is understood that the specific embodiments described herein are only intended as illustrative and not limiting. The present disclosure may be practiced without some of the details of these specific details, as would be understood by the skilled in the art. The following description of the embodiments is merely intended to provide a better understanding of the disclosure by illustration of examples of the present disclosure.

It should be noted that, in this context, relationship terms such as first and second are used merely to distinguish one entity or operation from another entity or operation, and do not necessarily require or imply that there is any such an actual relationship or order between such entities or operations. Furthermore, the term "comprise" or "include" or any other variations thereof is intended to encompass a non-exclusive inclusion, such that a process, method, article, or device that comprises a plurality of elements includes not only those elements but also other elements that are not listed exactly, or elements that are inherent to such a process, method, article, or device. An element that is defined by the phrase "comprising", without limiting the disclosure, does not exclude the presence of additional elements in the process, method, article, or device.

With the rapid development of new energy technologies, various technologies serving new energy have also been greatly improved. Considering difficulty of charging, slow charging rate, and limited battery life, the battery swapping technology for new energy vehicles emerged.

The battery swapping technology adopts a "separation of vehicle and battery" approach, which may provide a battery swapping service for a vehicle through a battery swapping station. In the existing battery swapping technology, the vehicle is often stopped at a fixed location through a vehicle limit slot at a certain fixed position in the battery swapping station. Then a battery swapping device is controlled to travel to a certain fixed point within the fixed location to perform related operations of battery swapping. For example, a front moving plate and a rear moving plate may be installed in the battery swapping station. When the battery of the vehicle needs to be swapped, the front moving plate and the rear moving plate are controlled to move to a parking location suitable for the vehicle and wait for the vehicle to drive on.

However, in this technology, the user needs to stop the vehicle at an accurate location to swap the battery, and it takes more time and energy to stop the vehicle, which makes the entire battery swapping process complicated.

Therefore, there is a need for a technical solution that can improve the convenience of the battery swapping process.

Based on above, the embodiments of the present application provide a battery swapping method, apparatus, device, and medium, which may be applied to an application scenario of battery swapping for a vehicle. Compared with the above related technologies, the battery swapping can be completed even when the user parks the vehicle randomly in the battery swapping area, which improves the convenience of the battery swapping process.

In order to better understand this application, before introducing the battery swapping solutions provided by the embodiments of this application, the embodiments of this application first provide specific explanations on the concepts of vehicle, battery, and battery swapping station involved in this application in turn.

Regarding "vehicle", the vehicle in the embodiments of the present application may be detachably connected to the battery. In some embodiments, the vehicle may be one that uses a battery as a power source, for example a car, a truck, or the like. The vehicle in the embodiments of the present application may be installed with one or more batteries.

Regarding "battery", the battery in the embodiments of the present application may be a lithium ion battery, a lithium metal battery, a lead-acid battery, a nickel barrier battery, a nickel hydrogen battery, a lithium sulfur battery, a lithium air battery, or a sodium ion battery, etc., which is not limited herein.

In terms of scale, the battery may be a battery cell, or a battery module or a battery pack, which is not limited herein.

In terms of application, the battery may be used in an electric vehicle to supply power to a motor of the electric vehicle as the power source for the electric vehicle. The battery may also provide power for other electrical devices of the electric vehicle, such as an air conditioner in the car, a car player, and so on.

Regarding "battery swapping station", in the embodiments of the present application, the battery swapping station may refer to a place that provides a battery swapping service for vehicles. For example, it may be a fixed place, or a mobile place such as a mobile vehicle for battery swapping, which is not limited in the embodiments of the present application.

After introducing the above concepts, for ease of understanding, before specific description of the charging of the power battery provided in the embodiments of the present application, the following parts of the embodiments of the present application will first illustrate an exemplary battery swapping scenario.

FIG. 1 is a schematic scenario diagram of an exemplary battery swapping scenario provided by an embodiment of the present application. As shown in FIG. 1, a battery swapping station 20 may include a battery swapping cabinet 21. The battery swapping cabinet 21 may include multiple charging compartments 22.

After a vehicle equipped with a battery P1 enters the battery swapping area of the battery swapping station 20, the battery swapping station 20 removes the battery P1 from the bottom the vehicle 10 through a battery swapping module, takes out a battery P2 from a charging compartment 22, and install the battery P2 in the vehicle 10. Then the vehicle 10 installed with the battery P2 may be driven away from the battery swapping station 20.

In addition, for the removed battery P1, it may be placed in an empty charging compartment 22 for charging, so that the battery swapping station 20 may continue to provide battery swapping service for other vehicles.

After introducing the battery swapping scenario, next, for better understanding of the present application, battery swapping methods, apparatus, devices, and media according to the embodiments of the present application will be detailed below in conjunction with the accompanying drawings. It should be noted that these embodiments are not used to limit the scope of the present application.

Figure 2:
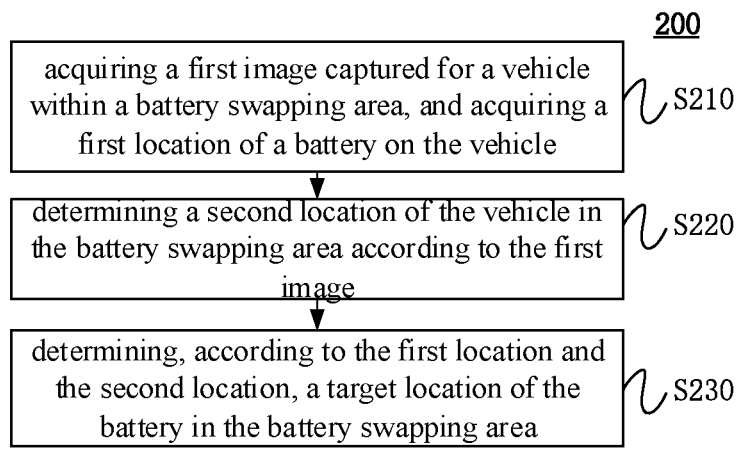
FIG. 2 is a schematic flow chart of a battery swapping method provided by an embodiment of the present application.

FIG. 2 is a schematic flow chart of a battery swapping method provided by an embodiment of the present application. As shown in FIG. 2, the battery swapping method includes S210 to S230. The execution body of each step in the battery swapping method may be a control module with computing and data processing capabilities. For example, it may be a control module on a cloud server or a server of the battery swapping station, which is not specifically limited.

At S210, a first image captured for a vehicle within a battery swapping area is acquired, and a first location of a battery on the vehicle is acquired.

At S220, a second location of the vehicle in the battery swapping area is determined according to the first image.

At S230, according to the first location and the second location, a target location of the battery in the battery swapping area is determined to control a battery swapping device to move to the target location for battery swapping.

After preliminarily introducing the specific steps S210 to S230 of the battery swapping method 200, technical terms involved in S210 to S230 are described in detail next.

For the battery swapping area, it may be an area for the vehicle to perform battery swapping. In other words, when the vehicle is parked in this area, battery swapping can be performed on the vehicle. Specifically, the battery swapping area may be an area capable of accommodating a vehicle and having a certain length and width. That is, the width of the battery swapping area is greater than the width of the vehicle, and the length of the battery swapping area is greater than the length of the vehicle.

For the first image, in order to ensure the calculation accuracy, the first image may include an image of the entire battery swapping area or an image of a part of the battery swapping area. When the vehicle enters the battery swapping area, the first image may also include at least part of the image of the vehicle.

In some embodiments, the first image may be collected by a charge coupled device (CCD) or another camera or webcam capable of taking pictures and videos. Regarding an arrangement location, the photographing device of the first image can be arranged on a fixed bracket over or above the battery swapping area, or on the inner wall of the battery swapping area. It should be noted that the photographing device of the first image may also be set at other locations where the entire battery swapping area can be photographed, and its arrangement location is not specifically limited in the embodiments of the present application.

Figure 3:
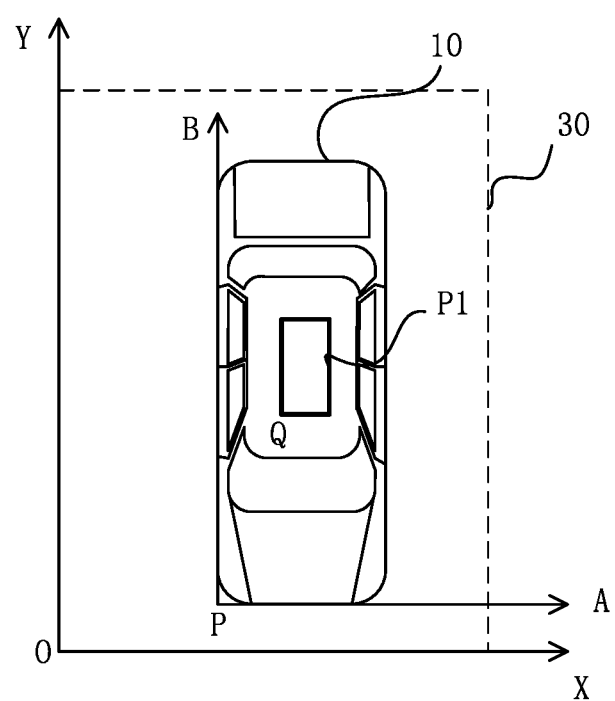
FIG. 3 is a schematic diagram of an exemplary calculation of a target location provided by an embodiment of the present application.

For the first location, it may refer to a relative location of the battery on the vehicle. In some embodiments, FIG. 3 is a schematic diagram of an exemplary calculation of a target location provided by an embodiment of the present application. As shown in FIG. 3, the first location may be location information of one or more reference locations Q of the battery relative to one reference location P on the vehicle. The reference locations Q of the battery may be the midpoint of the battery, or a certain corner of the battery, etc., which is not specifically limited. The reference location P on the vehicle may be the center or corner of the vehicle, etc., which is not specifically limited.

Exemplarily, with reference to FIG. 3 continuously, the location information of the first location may include: coordinates of the reference location Q in a first coordinate system APB with the location point P as the origin. The horizontal axis of the first coordinate system APB may be the width direction of the vehicle, and the vertical axis may be the length direction of the vehicle. Correspondingly, the first location may be expressed as (W1, L1). W1 may be expressed as the distance of the reference location Q from the reference location P in the width direction of the vehicle, and L1 may be expressed as the distance of the reference location Q from the reference location P in the length direction of the vehicle.

In some embodiments, if multiple batteries are installed on the vehicle, it may be necessary to obtain the first location of each of the batteries on the vehicle. In another embodiment, if the lengths and widths of the multiple batteries are known, the first location corresponding to a respective battery can be determined based on relative coordinates between a certain reference location Q on the battery and a certain reference location Q of the vehicle.

In some embodiments, the first location may be calculated by a processing module according to model information of the vehicle and sent to the execution subject of S210, or it may be calculated by the execution subject of S210 according to the model information of the vehicle, which is not specifically limited in the embodiments of the present application.

Secondly, for the battery swapping device, it may be a device or structure that can enter the bottom of the vehicle and replace the battery, such as a battery swapping robot, an automated guided vehicle (AGV), etc., which is not specifically limited.

For the second location, it may be relative location information of the vehicle in the battery swapping area.

In some embodiments, a certain location point O within the battery swapping area may be used as a reference, and location information of the reference location P of the vehicle relative to the location point O may be used as the second location. For example, the second location may be coordinates of the reference location P of the vehicle in a second coordinate system with the location point O as the origin. The coordinate axes of the second coordinate system may be parallel to the coordinate axes of the first coordinate system or have a certain included angle, which is not specifically limited in the embodiments of the present application.

Exemplarily, with reference to FIG. 3 continuously, the second location may include: coordinates of the reference location P in the second coordinate system XOY with the location point O as the origin. The horizontal axis of the second coordinate system XOY may be the width direction of the vehicle, and the vertical axis may be the length direction of the vehicle. Correspondingly, the second location may be expressed as (X1, Y1). X1 may be expressed as the distance of the reference location P from the reference location O in the width direction of the vehicle, and Y1 may be expressed as the distance of the reference location P from the reference location O in the length direction of the vehicle.

It should be noted that the second location may also be expressed in other forms. For example, after the coordinates of the reference location P are determined on the first image, the second location of the reference location P may be determined according to a conversion relationship between the first image and the actual location. The specific calculation method of the second location is not limited in the embodiments of the present application.

In an embodiment, in order to accurately determine the reference location P from the first image, a locating mark may be affixed to the reference location P on the vehicle so as to rapidly and accurately identify the locating mark out from the first image. The locating mark may be arranged on a vehicle lamp, an exhaust pipe or on the top shell of the vehicle. The specific setting location is not limited.

In another embodiment, in order to accurately determine the reference location P from the first image, an edge algorithm may be used to determine the contour of the vehicle from the first image, and a corner on the contour may be determined as the reference location P by calculating gradients and so on.

In some embodiments, the number of reference locations P may be one or more.

Since the user may park the vehicle crookedly during the actual parking and battery swapping process, when the number of reference locations P is more than one, a slant angle of the vehicle may be determined, so that the target location of the battery may be calculated according to the slant angle of the vehicle in the subsequent process. In this way, the calculation accuracy is improved. The slant angle of the vehicle may refer to the included angle between the long side of the vehicle and the long side of the battery swapping area.

For S230, the actual physical location information of the battery may be calculated according to the actual physical location information of the vehicle and the relative location of the battery on the vehicle. Exemplarily, with reference to FIG. 3 continuously, the target location is the location coordinate of the battery in the XOY coordinate system.

Regarding the calculation method for the target location.

In some embodiments, in the case where the slant degree of the vehicle is small, for example, the slant angle of the vehicle is less than a preset slant angle threshold, or the slant degree of the vehicle can be ignored due to the setting of the battery swapping area, if the first location is (W1, L1), the second location is (X1, Y1), then the target location of the battery in the battery swapping area is (W1+X1, L1+Y1). The preset slant angle threshold may be set according to actual scenes and specific requirements, which is not specifically limited. Exemplarily, if the battery swapping area in the swapping station, such as the parking space for battery swapping, is narrow, the slant angle of the vehicle when entering the parking space for battery swapping will not be too large. In this case, the target location of the battery in the battery swapping area may be calculated directly according to the calculation method in this embodiment.

In some embodiments, if the slant angle α of the vehicle is calculated according to multiple second locations, the target location may be calculated according to the first location, the second location, and the slant angle α. The specific calculation formula may be set according to the actual situation, which is not limited here.

With the battery swapping method 200 shown in step S210 to step S230, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved According to some embodiments of the present application, optionally, in order to further improve the calculation accuracy of the target location, a signal transmitting module is provided on the vehicle at a location corresponding to the battery, and a signal sensing module is provided on the battery swapping device.

Figure 4:
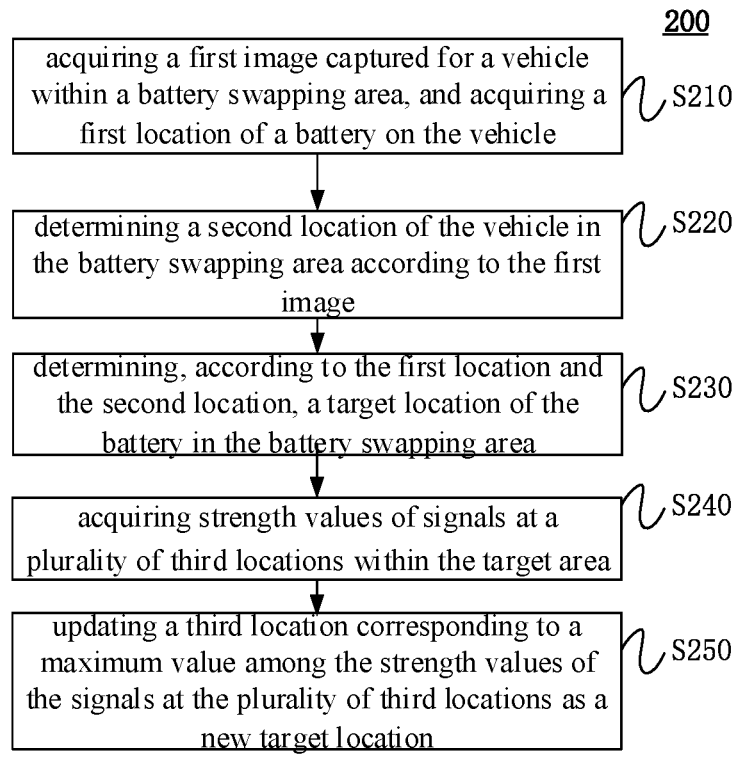
FIG. 4 is a schematic flow chart of another battery swapping method provided by an embodiment of the present application.

Correspondingly, FIG. 4 is a schematic flow chart of another battery swapping method provided by an embodiment of the present application. FIG. 4 differs from FIG. 2 in that the battery swapping method also includes S240 and S250.

At S240, during movement of the battery swapping device in a target area, strength values of signals at a plurality of third locations within the target area are acquired by the signal receiving module, the signals being transmitted by the signal transmitting module, and the target area including the target location.

At S250, a third location corresponding to a maximum value among the strength values of the signals at the plurality of third locations is updated as a new target location.

For the signal transmitting module, it may transmit a signal whose signal strength gradually decreases with distance such as a magnetic signal, an electrical signal, an optical signal and the like. Accordingly, the signal receiving module is a device that can receive the signal transmitted by the signal transmitting module. In an example, the signal transmitting module may be a magnetic element, such as a magnet and the like, and the signal receiving module is a magnetic sensing module, such as a Hall sensor. In another example, the signal transmitting module may be a wireless communication signal transmitter, and the signal receiving module is a wireless communication signal sensing module. The wireless communication signal may be, for example, a WIFI signal, a Bluetooth signal, and so on. In yet another example, the signal transmitting apparatus may be a transmitter of a linearly emitted optical signal such as an infrared signal or a laser signal, and accordingly, the signal receiving module may be an optical signal sensing apparatus. The optical signal transmitted by the signal transmitting apparatus may be vertically downward, and when the battery swapping device carrying the signal sensing module moves directly below the signal transmitting apparatus, the optical signal will be collected.

For the target area, it refers to an area including the target location. In some embodiments, the target area may be an area centered on the target location. The size and/or shape of the area may be preset. It should be noted that the target area may be an area not centered on the target location, and the specific setting method is not limited.

In some embodiments, since the target location of S210 to S230 is calculated by an image recognition algorithm, the calculated target location may have a certain accuracy error, such as (± a cm). In order to take into account both calculation accuracy and calculation efficiency, a target area may be determined with a cm as the radius and with the target location determined in S230 as the center of the circle, and then the battery swapping device is controlled to move within the target area to collect strength values of signals at a plurality of third locations within the target area.

It should be noted that, in order to improve the calculation accuracy, the radius of the target area may be greater than a cm. Or in order to improve calculation efficiency, the radius of the target area may be less than a cm. The radius, shape, etc. of the target area is not specifically limited in the embodiments of the present application.

With S240 and S250, the location error of the battery can be reduced, for example, to a range of (−5 mm, +5 mm). Thus, the locating accuracy is improved.

According to some embodiments of the present application, optionally, since the installation location of the battery on the specific vehicle is fixed, and the location of the battery on different vehicles may be different, the battery is installed on, for example, the head of the vehicle of some vehicle models, while installed in the middle of the vehicle of other vehicle models.

Therefore, in order to improve the calculation accuracy, the first location may be determined by the processing module based on the vehicle model information from the pre-stored correspondence relationship that is between the model information of the vehicle and the relative location of the battery on the vehicle. The model information of the vehicle may be an identifier that can uniquely indicate the model of the vehicle such as the identification information of the vehicle. Different vehicle models correspond to different model information. The correspondence relationship may include correspondence relationship between multiple model information and multiple related locations. Illustratively, the correspondence relationship includes: the correspondence relationship between model A and a corresponding location of the battery on the model A, and the correspondence relationship between model B and a corresponding location of the battery on the model B.

The processing module may be a server of a battery swapping station or a cloud server, which is not limited. In an example, if the processing module and the control module belong to the same device, for example, both belong to the cloud server, the processing module and the control module may be different functional modules or units in the same device. In another example, the processing module and the control module may be different devices. For example, one of the processing module and the control module is a server of a battery swapping station, and the other of the processing module and the control module is a cloud server, which is not specifically limited.

With this embodiment, the relative location of the battery on the vehicle can be accurately obtained through the stored correspondence relationship. Thus the calculation accuracy is improved.

According to some embodiments of the present application, optionally, for the model information of the vehicle mentioned in introducing the first location, in an example, the model information of the vehicle is determined according to the license plate information of the vehicle captured by shooting and preset license plate information and vehicle model information. The correspondence relationship between the license plate information and the vehicle may be pre-stored in the server of the battery swapping station or the cloud server, which is not specifically limited. In another example, the model information of the vehicle is obtained based on scheduled battery swapping information sent by a terminal device. The scheduled battery swapping information is used to request battery swapping for the vehicle. The preset battery swapping information may include the model information of the vehicle, or include the identification information of the vehicle, and the processing module may determine the model information of the vehicle according to the identification information of the vehicle.

In an embodiment, the model information of the vehicle may be determined according to the first image. Correspondingly, the step of determining the signal information according to the first image and further determining the first location may include step A1 and step A2.

At step A1, the model information of the vehicle is determined based on the first image.

In an example, the model information of the vehicle may be determined according to the matching between a vehicle area in the first image and a preset template of various vehicle models. For example, if the vehicle area in the first image matches the model A, the model information of the vehicle indicates that the vehicle is the model A.

In another example, the first image may be input into a pre-trained model recognition pattern to determine the model information of the vehicle in the first image.

The specific method for determining the model information of the vehicle is not limited in the embodiments of the present application.

At step A2, the model information is transmitted to the processing module, for determining, by the processing module, the first location based on the correspondence relationship between model information and a preset relative location of the battery on the vehicle of a model.

For the specific content of step A2, reference may be made to the relevant description in the above part of this application, which will not be repeated here.

With this embodiment, the model information of the vehicle can be determined based on the first image, and in turn the first location is determined, so that the first location and below the second location can be computed with only provision of an acquiring apparatus of the first image. In this way, device cost is saved.

It should be noted that the model information and the first location of the vehicle may also be determined according to other images taken for the vehicle. The specific implementation is similar to the above, and will not be repeated here.

According to some embodiments of the present application, optionally, if the number of first images acquired through S210 is more than one, the plurality of first images may also be used to ensure the safety during the battery swapping process.

Figure 5:
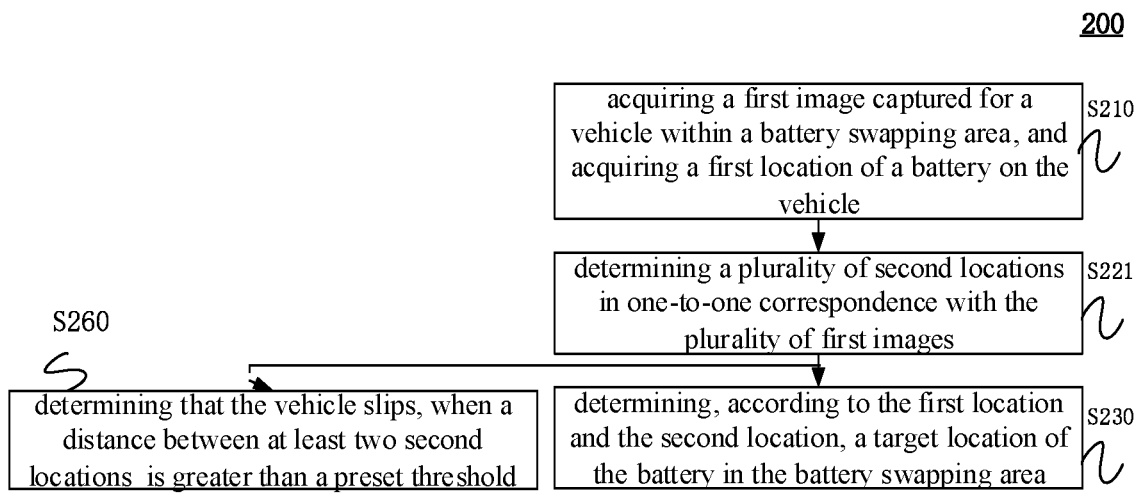
FIG. 5 is a schematic flow chart of yet another battery swapping method provided by an embodiment of the present application.

Correspondingly, in order to improve the safety in the battery swapping process, FIG. 5 is a schematic flow chart of yet another battery swapping method provided by an embodiment of the present application. FIG. 5 differs from FIG. 2 in that S220 may be specifically implemented as S221, and after S230, the battery swapping method 200 may further include S260.

At S221, a plurality of second locations in one-to-one correspondence with the plurality of first images are determined. For the method of determining the second locations, reference may be made to the relevant content of the above-mentioned part of the embodiments of the present application, which will not be repeated here.

At S260, it is determined that the vehicle slips, when a distance between at least two second locations of the plurality of second locations is greater than a preset threshold.

The preset threshold may be set according to actual scenarios and specific requirements, which is not specifically limited.

The distance between every two second locations may be the Euclidean distance between the two locations. For example, if the two second locations are respectively expressed as (X1, Y1) and (X2, Y2), the distance between the two second locations may be expressed as the following formula (1):

$$\sqrt{(X2-X1)^2-(Y2-Y1)^2} \qquad (1)$$

It should be noted that execution order between S220 and S270 is not limited in the embodiments of the present application. S270 may be performed before S220, or S220 and S270 may be performed synchronously, or S270 may be performed after S220. The execution order between the two steps is not limited in the embodiments of the present application.

In an embodiment, after determining that the vehicle slips, the user may be notified to brake in time, or the battery swapping process may be controlled to suspend, or a blocking device may be moved to the rear of the vehicle to prevent continued slipping.

With this embodiment, it can be monitored whether the vehicle slips during the battery swapping process, and an alert can be issued timely when the vehicle slips. Thus, safety of battery swapping is improved.

Figure 6:
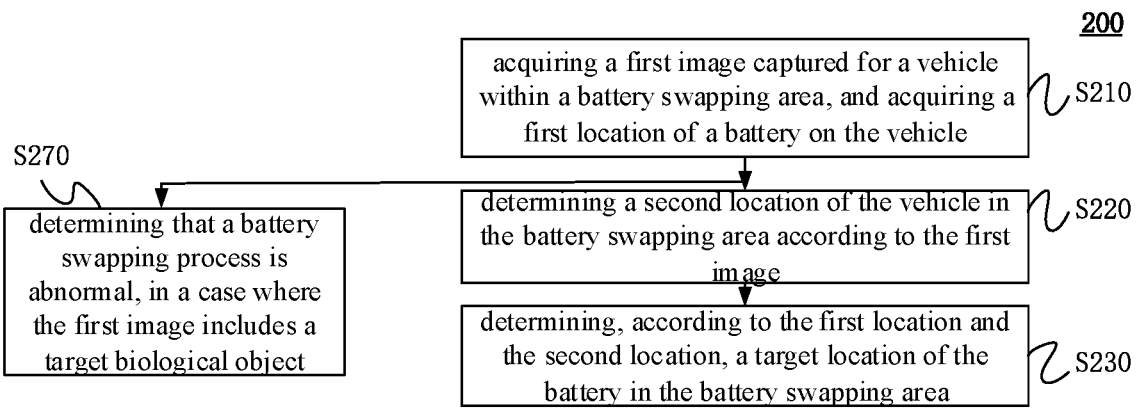
FIG. 6 is a schematic flow chart of still yet another battery swapping method provided by an embodiment of the present application.

According to some embodiments of the present application, optionally, FIG. 6 is a schematic flow chart of still yet another battery swapping method provided by an embodiment of the present application. FIG. 6 differs from FIG. 2 in that after S210, the battery swapping method 200 further includes S270.

At S270, it is determined that the battery swapping process for the vehicle is abnormal, in a case where the first image includes a target biological object.

The target biological object may be a human, an animal, etc. In the embodiments of the present application, a method for identifying the target biological object may be template matching, model recognition, etc., which is not specifically limited. For another example, moving targets in multiple images may be detected, and the moving targets may be regarded as the target biological objects. Exemplarily, after binarizing the multiple images respectively, difference calculation may be performed on the images. For an area where the calculation result is 0, it means that the target in the area is a static target; and for an area where the calculation result is 1, the area may be identified as a target biological object.

It should be noted that execution order between S220 and S270 is not limited in the embodiments of the present application. S270 may be performed before S220, or S220 and S270 may be performed synchronously, or S270 may be performed after S220. The execution order between the two steps is not limited in the embodiments of the present application.

In an embodiment, after determining that the battery swapping process is abnormal, the battery swapping process may be suspended until the first image does not include the target biological object. Alternatively, a broadcasting device in the battery swapping station may be used to notify the target biological object to move to a safe area.

With this embodiment, in order to ensure the safety of the battery swapping, it is necessary to prohibit the biological user object from getting off the vehicle. Therefore, when the target biological object is recognized in the first image, it means that a living body such as a user or an animal interferes with the battery swapping process, and thus it is determined that the battery swapping process is abnormal. In this way, the safety of the battery swapping process can be ensured.

Based on the same invention concept, in addition to providing battery swapping methods, the embodiments of the present application also provide corresponding battery swapping modules.

Battery swapping modules according to the embodiments of the present application will be described in detail below with reference to the accompanying drawings.

Figure 7:
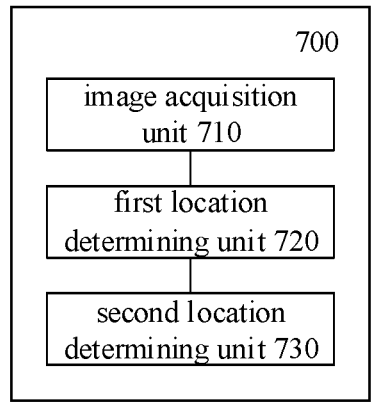
FIG. 7 is a schematic structural diagram of a battery swapping module provided by an embodiment of the present application.

FIG. 7 is a schematic structural diagram of a battery swapping module provided by an embodiment of the present application. As shown in FIG. 7, the battery swapping module 700 includes: an image acquiring unit 710, configured to acquire a first image captured for a vehicle within a battery swapping area, and acquire a first location of a battery on the vehicle; a first location determining unit 720, configured to determine a second location of the vehicle in the battery swapping area according to the first image; and a second location determining unit 730, configured to determine, according to the first location and the second location, a target location of the battery in the battery swapping area to control a battery swapping device to move to the target location for battery swapping.

In some embodiments of the present application, a signal transmitting module is provided on the vehicle at a location corresponding to the battery, and a signal receiving module is provided on the battery swapping device.

The battery swapping module 700 further includes: a signal acquiring unit, configured to acquire, by the signal receiving module during movement of the battery swapping device in a target area, strength values of signals at a plurality of third locations within the target area, the signals being transmitted by the signal transmitting module, and the target area including the target location; and a location updating unit, configured to update a third location corresponding to a maximum value among the strength values of the signals at the plurality of third locations as a new target location.

In some embodiments of the present application, the first location is determined by a processing module from a pre-stored correspondence relationship based on model information of the vehicle, and transmitted. The correspondence relationship is a preset one between a vehicle model and a relative location of the battery on the vehicle of the model.

In some embodiments of the present application, the battery swapping module 700 further includes: an information determining unit, configured to determine the model information of the vehicle based on the first image; and an information transmitting unit, configured to transmit the model information to the processing module, for determining, by the processing module, the first location based on the correspondence relationship between model information and a preset relative location of the battery on the vehicle of a model.

In some embodiments of the present application, the number of the first images is plural. The first location determining unit 720 is configured to determine a plurality of second locations in one-to-one correspondence with the plurality of first images. The battery swapping module 700 further includes: a slip detecting unit, configured to determine that the vehicle slips, when a distance between at least two second locations of the plurality of second locations is greater than a preset threshold.

In some embodiments of the present application, the battery swapping module 700 further includes: a fault determining unit, configured to determine that a battery swapping process for the vehicle is abnormal, in a case where the first image includes a target biological object.

According to the battery swapping modules of the embodiments of the present application, for a vehicle that is randomly parked in the battery swapping area, the location of the vehicle in the battery swapping area can be determined according to the first image captured for the vehicle; and then the location of the battery in the battery swapping area is determined according to the relative location of the battery on the vehicle and the location of the vehicle in the battery swapping area. Therefore, even if the user parks the vehicle randomly in the battery swapping area, the location of the vehicle's battery in the battery swapping area can still be determined, and the battery swapping module is moved to this location for battery swapping. Thus the convenience of the battery swapping process is improved.

Other details of the battery swapping modules according to the embodiments of the present application are similar to that of the battery swapping methods described above in conjunction with the examples shown in FIGS. 2 to 6 and corresponding technical effects may be achieved, which will not be repeated here for brief.

Figure 8:
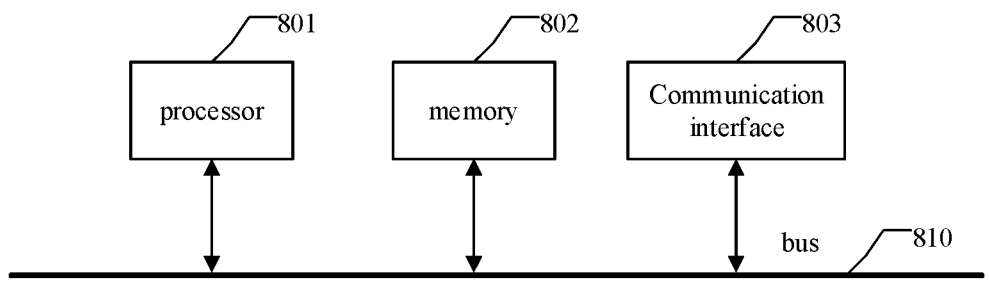
FIG. 8 shows a schematic diagram of hardware structure of a battery swapping device provided by an embodiment of the present application.

FIG. 8 shows a schematic diagram of hardware structure of a battery swapping device provided by an embodiment of the present application.

The battery swapping device may include a processor 801 and a memory 802 storing computer program instructions.

Specifically, the above processor 801 may include a Central Processing Unit (CPU), or an Application Specific Integrated Circuit (ASIC), or may be configured to be one or more integrated circuits implementing the embodiments of the present application.

The memory 802 may include a large-capacity memory for data or instructions. For example rather than limitation, the memory 802 may include a Hard Disk Drive (HDD), a floppy disk drive, a flash memory, an optical disk, a magneto-optical disk, a magnetic tape, or a Universal Serial Bus (USB) drive, or a combination of two or more thereof. In some examples, the memory 802 may include removable or non-removable (or fixed) media, or the memory 802 is a non-volatile solid-state memory. In some embodiments, the memory 802 may be inside or outside of the battery swapping device.

In some examples, the memory 802 may be a Read Only Memory (ROM). In an example, the ROM may be a mask-programmed ROM, a programmable ROM (PROM), an erasable PROM (EPROM), an electrically erasable PROM (EEPROM), an electrically erasable ROM (EAROM), or flash memory or a combination of two or more thereof.

The memory 802 may include a read-only memory (ROM), a random access memory (RAM), a magnetic disk storage media device, an optical storage media device, a flash memory device, an electrical, optical, or other physical/tangible memory storage device. Therefore, generally, the memory includes one or more tangible (non-transitory) computer-readable storage media (e.g., memory devices) encoded with software including computer-executable instructions, and when the software is executed (e.g., by one or more processors), it is operable to perform the operations described with reference to the methods according to an aspect of the present disclosure.

The processor 801 implements the methods/steps in the embodiments shown in FIGS. 2-6 by reading and executing the computer program instructions stored in the memory 802 and achieves the corresponding technical effects when implementing the methods/steps in the embodiments shown in FIGS. 2-6, which will not be repeated for conciseness.

In an example, the battery swapping device may further include a communication interface 803 and a bus 810. As shown in FIG. 8, the processor 801, the memory 802, and the communication interface 803 are connected and complete mutual communication through the bus 810.

The communication interface 803 is mainly used to implement communication between various modules, devices, units and/or devices in the embodiments of the present application.

The bus 810 includes hardware, software, or both, and couples components of online data flow accounting device to each other. For example rather than limitation, the bus may include Accelerated Graphics Port (AGP) or other graphics bus, Extended Industry Standard Architecture (EISA) bus, Front Side Bus (FSB), Hyper Transport (HT) interconnection, Industry Standard Architecture (ISA) bus, unlimited bandwidth interconnection, Low Pin Count (LPC) bus, memory bus, micro channel architecture (MCA) bus, Peripheral Component Interconnection (PCI) bus, PCI-Express (PCI-X) bus, Serial Advanced Technology Attachment (SATA) bus, Video Electronics Standards Association Local (VLB) bus or other suitable bus, or a combination of two or more thereof. Appropriately, the bus 810 may include one or more buses. Although the embodiments of the present application describe and show a specific bus, any suitable bus or interconnection is contemplated in the present application.

The battery swapping device may execute the battery swapping methods in the embodiments of the present application, so as to realize the battery swapping method and module described in conjunction with FIGS. 2-7.

In addition, in combination with the battery swapping methods in the above embodiments, the embodiments of the present application may provide a computer storage medium for implementation. The computer storage medium stores computer program instructions which, when executed by the processor, implement any of the battery swapping methods in the above embodiments.

It should be clear that the present application is not limited to the specific configuration and process described above and shown in the drawings. For the sake of brevity, a detailed description of known method is omitted here. In the above embodiments, several specific steps are described and shown as examples. However, the method process of the present application is not limited to the specific steps described and shown, and those skilled in the art may make various changes, modifications and additions, or change the order between the steps after understanding the spirit of the present application.

The function modules in the above structural diagrams may be implemented as hardware, software, firmware, or a combination thereof. When implemented in hardware, it may be, for example, an electronic circuit, an application specific integrated circuit (ASIC), appropriate firmware, a plug-in device, a function card, and the like. When implemented in software, the elements of the present disclosure may be program(s) or code segment(s) that is used to perform the required tasks. The program(s) or code segment(s) may be stored in a machine-readable medium, or transmitted on a transmission medium or a communication link through a data signal carried on a carrier wave. A "machine-readable medium" may include any medium capable of storing or transmitting information. Examples of machine-readable media include electronic circuits, semiconductor memory devices, ROM, flash memory, erasable ROM (EROM), floppy disks, CD-ROMs, optical disks, hard disks, optical fiber media, radio frequency (RF) links, etc. Code segments may be downloaded via a computer network such as the Internet, an intranet, and the like.

It should also be noted that the exemplary embodiments mentioned in the present application describe some methods or systems based on a series of steps or devices. However, the present application is not limited to the order of the above steps, that is, the steps may be performed in the order mentioned in the embodiments, or may be performed in a different order from that of the embodiments, or several steps may be performed at the same time.

Various aspects of the present disclosure have been described above with reference to the flowcharts and/or block diagrams of the methods, apparatuses, devices, and computer program products according to the embodiments of the present disclosure. It should be understood that each block in the flowcharts and/or block diagrams and combinations of blocks in the flowcharts and/or block diagrams can be implemented by computer program instructions. These computer program instructions can be provided to a processor of a general-purpose computer, a special-purpose computer, or other programmable data processing device to produce a machine, so that the execution of these instructions via the processor of the computer or other programmable data processing device enables implementation of the functions/actions specified in one or more blocks of the flowcharts and/or block diagrams. Such a processor can be, but is not limited to, a general-purpose processor, a dedicated processor, a special application processor, or a field programmable logic circuit. It can also be understood that each block in the block diagrams and/or flowcharts and the combination of the blocks of the block diagrams and/or flowcharts can also be implemented by dedicated hardware that performs the specified function or action, or can be implemented by a combination of dedicated hardware and computer instructions.

The above descriptions are only specific implementations of the present application. Those skilled in the art can clearly understand that for convenience and conciseness of description, the specific operation process of the above-described systems, modules and units may refer to the corresponding process in the forgoing method embodiments, which will not be repeated here. It should be understood that the protection scope of the present application is not limited to the embodiments, and any person skilled in the art can easily conceive various equivalent modifications or substitutions within the technical scope disclosed in the present application, and these modifications or substitutions should be within the protection scope of the present application.

What is claimed is:

1. A battery swapping method applied to a control module, the method comprising:
    acquiring a first image captured for a vehicle within a battery swapping area, and acquiring a first location of a battery on the vehicle;
    determining a second location of the vehicle in the battery swapping area according to the first image;
    determining, according to the first location and the second location, a target location of the battery in the battery swapping area to control a battery swapping device to move to the target location for battery swapping,
    wherein a signal transmitting module is provided on the vehicle at a location corresponding to the battery, and a signal receiving module is provided on the battery swapping device;
    the method further comprises:
    during movement of the battery swapping device in a target area, acquiring, by the signal receiving module, strength values of signals at a plurality of third locations within the target area; the signals being transmitted by the signal transmitting module, and the target area including the target location;
    updating a third location corresponding to a maximum value among the strength values of the signals at the plurality of third locations as a new target location.

2. The method according to claim 1, wherein the first location is determined by a processing module from a pre-stored correspondence relationship based on model information of the vehicle and transmitted to the control module, and the correspondence relationship is one between the model information of the vehicle and a relative location of the battery on the vehicle.

3. The method according to claim 2, wherein the method further comprises:
    determining the model information of the vehicle based on the first image;
    transmitting the model information to the processing module, for determining, by the processing module, the first location based on the correspondence relationship.

4. The method according to claim 1, further comprising:
    determining that a battery swapping process for the vehicle is abnormal, in a case where the first image include a target biological object.

5. A battery swapping device comprising:
    a processor, and a memory storing computer program instructions,
    wherein the processor reads and executes the computer program instructions to implement the battery swapping method according to claim 1.

6. A battery swapping device comprising:
    a processor, and a memory storing computer program instructions,
    wherein the processor reads and executes the computer program instructions to implement the battery swapping method according to claim 2.

7. A battery swapping device comprising:
    a processor, and a memory storing computer program instructions,
    wherein the processor reads and executes the computer program instructions to implement the battery swapping method according to claim 3.

8. A battery swapping device comprising:
    a processor, and a memory storing computer program instructions,
    wherein the processor reads and executes the computer program instructions to implement the battery swapping method according to claim 4.

9. The method according to claim 1, wherein the first image includes a plurality of images captured by one or more photographing devices;
    the determining a second location of the vehicle in the battery swapping area according to the first image comprises:
    determining a plurality of second locations in one-to-one correspondence with the plurality of images.

10. The method according to claim 9, wherein after the determining a second location of the vehicle in the battery swapping area according to the first image, the method further comprises:
    determining that the vehicle slips, when a distance between at least two second locations of the plurality of second locations is greater than a preset threshold.

11. A battery swapping device comprising:
    a processor, and a memory storing computer program instructions,
    wherein the processor reads and executes the computer program instructions to implement the battery swapping method according to claim 10.

12. A battery swapping module control module, comprising:
    an image acquiring unit, configured to acquire a first image captured for a vehicle within a battery swapping area, and acquire a first location of a battery on the vehicle;

a first location determining unit, configured to determine a second location of the vehicle in the battery swapping area according to the first image;

a second location determining unit, configured to determine, according to the first location and the second location, a target location of the battery in the battery swapping area;

a battery swapping control module, configured to control a battery swapping device to move to the target location for battery swapping, wherein a signal transmitting module is provided on the vehicle at a location corresponding to the battery, and a signal receiving module is provided on the battery swapping device;

the module further comprises:

a signal acquiring unit, configured to, acquire, by the signal receiving module during movement of the battery swapping device in a target area, strength values of signals at a plurality of third locations within the target area; the signals being transmitted by the signal transmitting module, and the target area including the target location;

a location updating unit, configured to update a third location corresponding to a maximum value among the strength values of the signals at the plurality of third locations as a new target location.

13. The module according to claim 12, wherein the first location is determined by a processing module from a pre-stored correspondence relationship based on model information of the vehicle and transmitted to the control module, and the correspondence relationship is one between the model information of the vehicle and a relative location of the battery on the vehicle.

14. The module according to claim 13, wherein the module further comprises:

an information determining unit, configured to determine the model information of the vehicle based on the first image;

an information transmitting unit, configured to transmit the model information to the processing module, for determining, by the processing module, the first location based on the correspondence relationship.

15. The module according to claim 12, further comprising:

a fault determining unit, configured to determine that a battery swapping process for the vehicle is abnormal, in a case where the first image include a target biological object.

16. The module according to claim 12, wherein the first image includes a plurality of images captured by one or more photographing devices;

the first location determining unit is configured to:

determine a plurality of second locations in one-to-one correspondence with the plurality of images.

17. The module according to claim 16, wherein the module further comprises:

a slip detecting unit, configured to determine that the vehicle slips, when a distance between at least two second locations of the plurality of second locations is greater than a preset threshold.

18. A non-transitory computer storage medium storing computer program instructions thereon, which when executed by a processor, to cause the processor to:

acquire a first image captured for a vehicle within a battery swapping area, and acquire a first location of a battery on the vehicle;

determine a second location of the vehicle in the battery swapping area according to the first image;

determine, according to the first location and the second location, a target location of the battery in the battery swapping area to control a battery swapping device to move to the target location for battery swapping, wherein a signal transmitting module is provided on the vehicle at a location corresponding to the battery, and a signal receiving module is provided on the battery swapping device, and wherein the instructions, which when executed by the processor, to cause the processor to:

during movement of the battery swapping device in a target area, acquire, by the signal receiving module, strength values of signals at a plurality of third locations within the target area; the signals being transmitted by the signal transmitting module, and the target area including the target location; and update a third location corresponding to a maximum value among the strength values of the signals at the plurality of third locations as a new target location.

* * * * *